United States Patent Office 3,429,768
Patented Feb. 25, 1969

3,429,768
PROTEIN INSULATION MATERIAL
Harland H. Young, Western Springs, Ill., assignor to Swift & Company, Chicago, Ill., a corporation of Illinois
No Drawing. Filed May 11, 1964, Ser. No. 366,657
U.S. Cl. 161—214    5 Claims
Int. Cl. B32b *15/00;* C04b *43/00*

ABSTRACT OF THE DISCLOSURE

This disclosure relates to insulating material having a closed cellular structure. These materials are self-supporting foams made from degreased and defatted proteinaceous substances, the cells of which are filled with helium. A non-limiting example comprises an article having at least one metallic foil sheet and one foam layer possessing a closed cellular structure containing helium.

---

This invention relates to the manufacture of insulating materials and more particularly to foam compositions and methods for manufacturing said compositions. More specifically, the invention concerns thermal insulating foamboard of any desired shape. The foamboard of this invention, while of low density, nevertheless remains stable and firm at exceedingly low temperatures.

Insulating materials have found extensive use in the space industry. In the space industry an ever increasing supply of suitable insulating materials, which will function at the temperature of liquid hydrogen, oxygen, nitrogen and the like, is required. It has been conventional to use highly aerated structures for general purpose insulation since heat loss is readily retarded by means of "dead" air cells. As a result, felts, foams, cork and other low density materials have found widespread usage as insulation. In every such instance, however, the gas cell or "dead" area has contained ordinary air, nitrogen or carbon dioxide. These gases liquefy at cryogenic temperatures which results in collapse of the gas cell.

The problem of supplying suitable insulating materials for use in cryogenic laboratories has been solved somewhat by the use of "vacuum space" or "Thermos bottle" construction. While such construction is very satisfactory for cryogenic laboratory use, it is too expensive and too fragile for large installations, such as in receptacles for fuel used in rockets and missiles. Since "vacuum space" insulation is too expensive and/or fragile for installation in space craft wherein cryogenic temperatures are reached, the use of conventional low density materials has been the predominant method of insulating at these temperatures. However, conventional low density materials, whether natural or synthetic and whether fibrous or foamaceous in structure, are excellent insulating materials until cryogenic temperatures are reached. In general, cryogenic temperatures range from below the liquefication temperature of carbon dioxide, air, oxygen, nitrogen, and even hydrogen, down to near absolute zero (−273° C.). A practical lower limit would be the liquefication temperature for helium which is about −269° C. These low temperatures cause liquefication of air, oxygen, nitrogen, etc. Therefore, any insulating material having a cellular structure containing these gases would collapse at the point of liquefication, thereby losing all insulation value.

Liquid oxygen and liquid hydrogen are used as rocket fuels in large quantities. A slight collapse of a typical insulating material encasing liquid oxygen or liquid hydrogen, while producing only a slight amount of heat, will result in tremendous vapor losses. It can thus be seen that the prior art has failed to disclose insulating materials which would be adequate at cryogenic temperatures. It is therefore apparent that a commercially available insulating material, capable of functioning adequately at cryogenic temperatures, would be most desirable.

Accordingly, it is an object of this invention to produce insulating material which will perform satisfactorily at cryogenic temperatures.

It is also an object of this invention to provide various methods for the production of cryogenic insulating material.

Additional objects, if not specifically set forth herein, will be readily apparent to those skilled in the art from the detailed description of the invention which follows.

In general, the present invention relates to insulating material having a closed cellular structure. The products of this invention are self-supporting foams having a cellular structure comprising a proteinaceous foam, the cells of which are filled with helium. More specifically, the walls of the cells are proteinaceous in character and have excellent gas impermeability. The impermeability of such proteinaceous materials, and preferably collagenous material, to gases of high fugacity was clearly unexpected and surprising for it was thought that within a short period of time, the light helium would be displaced with the heavier air. In addition, it was surprising to find that the proteinaceous foams resisted the passage of hydrogen and helium even when plasticized with an equal weight of a polyhydric substance.

In accordance with the teachings of this invention, proteinaceous foam, with or without plasticizers, are prepared by expanding helium in an aqueous solution of the protein material. The expansion of helium may be accomplished in a number of ways. In general, the helium is forced under pressure into a protein solution at a temperature above the melting point of the proteinaceous solution. When the solution under pressure is sprayed into the atmosphere, the helium fills the cells and under proper conditions, the foam adheres to the walls of the vessel where it sets to a layer of foam. Loss of moisture proceeds but the foam retains the gaseous helium within the cells even though moisture continues to evaporate.

Generally speaking, the aqueous protein solution may contain an inorganic or organic protein insolubilizing agent, surfactants and hardening agents. With proper choice of surfactant materials, it is possible to regulate the number and volume of gaseous cells formed and thereby control the final density of the insulating material. Using the methods of this invention, it is possible to produce foams having a density of as low as ¼ to 2 lbs./cubic foot. The products have a coefficient of thermal conductivity of about $K=.25-.27$ (B.t.u./hr./ft.$^2$). Also of importance is the fact that the density of the foam is uniform throughout as the helium cells are substantially uniformly distributed throughout the entire mass. In all cases, the final product is an article in which the protein forms a continuous structure encasing bubbles of helium as the discontinuous phase. It is believed that it is the continuous phase property of the protein films that provides the barrier for gases of high fugacity.

Since the gas impermeability of the intant insulating material is dependent upon the ability of the proteinaceous material to form a continuous film, the protein solution should be free of foreign material, a fats, and other insoluble material. Removal of the fats from the protein, either before or after solubilization of the protein, has the added benefit of increasing the foaming tendency. Treatment of substantially degreased and defatted protein aceous material with the helium results in a surprisingly large amount of foam of uniform density. By degreased and defatted proteinaceous material, it is meant a protein containing less than about 1%, and preferably less than about ½%, fat or fatty substance.

Proteinaceous materials which may be used in this invention comprise glue, gelation, egg albumen, blood albumen, casein, soya and other seed proteins including zein. In addition, incompletely hydrolyzed derivatives of the proteins may be used. The only limitation being the ability to function as a film forming substance. The film strength of the protein cell walls must be sufficient to withstand the normal expansion and contraction of the entrapped helium and the above named proteins provide such strength.

The insulating products of this invention are produced by treatment of the above described proteins with helium. The method comprises making an aqueous solution of the water soluble protein, along with any of the desired additives, and foaming the mixture by introducing the helium in subdivided quantities followed by drying of the foamed mass, usually at an elevated temperature.

Numerous shapes and types of insulation foam may be produced by the various techniques of this invention. In the form preferred for commercial use, the foamed solution is shaped into a board on a sheet element such as kraft paper and adheres thereto upon drying. Generally, the protein foams are preferably used in areas where moisture is absent for even when tanning agents are used for the insolubilization of the protein, it is still possible for the foam to absorb moisture. Accordingly, it is preferred to coat the outer areas of the foam with some moisture barrier, such as any of the plastic films which exhibit moisture vapor impermeability. This, however, does not detract from the unique ability of the protein film of preventing loss of helium while permitting the flow of water vapor.

Tanning agents may be used to toughen and harden the protein with the purpose of ultimately insolubilizing the product. The tanning agents utilized include the typical water soluble salts of iron, aluminum and chromium. Specific examples include chromium sulfate and chormium chloride, aluminum sulfate and aluminum chloride, and ferric sulfate and ferric chloride. Typical organic salts of the above named metals may be used. For example, chromium acetate, aluminum acetate and ferric acetate.

Also, one may add a host of other additives which promote changes in fluidity, gel strength, rate of gelation, insolubilization, etc. However, no additive should be mixed in which would increase the permeability of the foams to helium since it is the helium impermeability that renders the proetins foams useful at cryogenic temperatures. It should be mentioned at this time that numerous plasticizers which are compatible with the proeins may be employed if desired, bearing in mind that rigidation may occur at extremely low temperatures. Plasticizers normally used in the flexibilizing of gelation, glue, or other proteins are poor conductors of heat and, thus, are recommended. These polyols are selected from the class of polyhydric materials containing about 2–8 carbons and about 2–8 hydroxyl groups with the understanding that there is one or less hydroxyl groups for each carbon atom. Examples of polyhydric materials include glycerol, glycols, such as 1,2-ethylene glycol and 1,3-propylene glycol, polyglycols, sorbitol and related polyols such as the invert or hydrolyzed sugar syrups. Usually 20 to 100 parts of plasticizer per 100 parts of protein may be used. However, in some instances, larger amounts (200 parts/100 parts of protein) have utility.

In addition to fat removal from the protein material, it is advantageous to add foaming agents in order to improve the ease of foaming. Furthermore, such additives make possible the control of the final cell size, concentration and therefore the density of the insulating foam. Almost any foaming agent is suitable so long as it is compatible with the protein solution at its ambient pH. It is preferred to use nonionic type surfactants although the conventional anionic sulfates and sulfonates, as well as the cationic quaternaries, are equally useful. The foaming agents improve the initial distribution of the helium during foaming of the solution and they help to stabilize the dispersion. Specfic nonionic surfactants include the alkylne oxide adducts of active hydrogen containing compounds. Adducts of ethylene oxide or propylene oxide with alkylated phenol, long chain alcohols and long chain mercaptans are typical examples of suitable nonionic surfactants. Water soluble salts of alkyl aryl sulfonates are quite useful. Specific examples include the alkali metal salts of alkylated benzene sulfonic acid. Sulfated alcohols, i.e., sodium lauryl sulfate, may be used. The foaming agent is used in an amount sufficient to lower the surface tension and increase the quantity and fineness of the bubbles. This amount is usually about 0.1 to 1 part per 100 parts of glue, gelatin or other proteinaceous material. Other materials are capable of enhancing the rate at which foams are formed but are not foaming agents or surfactants per se. These are usually sequestering or chelating agents such as phosphates, versenes, citrates, tartrates and numerous hydroxy carboxylic acids.

Several techniques are equally useful in the preparation of the protein encased foams. The specific method or combination of methods used will depend upon the ultimate place, time, and method of application. In general, however, a deaerated protein solution is whipped in an atmosphere of helium and the foam extruded by the positive pressure of helium within the foam generator. This is particularly suitable when the protein solution contains glue, gelation or albumens.

Another method comprises forcing helium into the protein solution under high pressure to effect maximum solubility at the operational temperature. The foam is then formed as the pressurized solution is released into the atmosphere. The foam may set to a gel by the drop in temperature or it may become rigid by drying and loss of moisture. Peculiarly enough, the water escapes readily whereas the helium remains within the cell. This method of foam generation can be adapted for application directly to the surface to be insulated and it may be extruded between two films of material such as metal, plastic or fabric, etc. On drying, the composition adheres to the sheet and forms a laminate.

Alternatively, the protein solution may be fed continuously into the bottom of a cylinder and over a gas dispersing mechanism to which helium gas is introduced. The foam, as produced, rises and is finally forced out of the top where it is layered between two membranes for encasement, followed by drying without collapsing the foam. Another method comprises spreading a previously formed foam of predetermined density on a backing material at a uniform rate. This dense foam, being moist and flexible, can be passed through a dryer at an elevated temperature or decreased pressure or both. A less dense foam is formed due to the expanding of the helium. In every case, the helium content of the individual cells is retained while the moisture leaves the system.

The following examples are presented to illustrate the invention. It will be understood that these examples are illustrative and should not be taken in any manner as limiting the invention as defined in the appended claims.

EXAMPLE I

A given amount of liquid egg whites (commercially frozen grade) at about 12% solids was mixed with 10% glycerine and 1% Triton X–100 which is a nonyl phenol ethoxylated with about 9–10 moles of ethylene oxide. The weight of both additives is based on the weight of the egg white solids. The uniform mixture was whipped in a conventional high speed Hobart mixer while under an atmosphere of pure helium. As the foam was formed by whipping, a sufficient positive pressure of helium was introduced so as to force the foam out of the whipper in a continuous ribbon. Upon drying and heating above the coagulation point of the albumen, an excellent cryogenic insulating foam was produced.

EXAMPLE II

A 16% aqueous solution of commerciallly dried albumen was stirred with a 10% glycerine solution, based on the weight of the albumen, and the uniform mixture whipped with a high speed mixer while under an atmosphere of pure helium. Sufficient positive pressure of helium was applied so as force the foam out of the whipper in a continuous sheet between two paper membranes. The encased foam was allowed to dry at room temperature. The product was then heated to about 160° F. for 3 minutes so as to coagulate the albumen and render it substantially insoluble.

EXAMPLE III

A solution of 8%, by weight, of dried egg albumen in water containing 0.05% ammonium lauryl sulfate and 1% triethylene glycol was prepared. This solution was placed in a pressurized cylinder containing helium gas under 200 p.s.i. pressure. A sprayable stable foam was generated from this pressurized cylinder and adhered to a wide range of materials. Upon drying, the product functioned as an excellent cryogenic insulator.

EXAMPLE IV

A solution containing 10% gelatin, 2% glycerine, and 0.1% lauryl amine acetate in water was warmed to 120° F. Helium gas was introduced at the bottom of the container through a ceramic dispersator. The bubbles enlarged as the foam rose to the top of the cylinder. The foamed gelatin was spread on paper which had been laminated with aluminum foil. The foam, without too rapid cooling, was leveled by passing under a scrapper arm. The continuous sheet was passed through an air tunnel where the chill of evaporation set the foam to a gel.

EXAMPLE V

A solution of 15% gelatin in water containing 5% glycerine and .05% octadecyl dimethyl ethyl ammonium bromide as a foaming agent and preservative was placed in an evacuated whipper. All air was successively removed and bacfilled with helium until the air was substantially completely replaced. The whipping was then carried on under a positive but small helium pressure. The temperature was around 100–105° F. A smooth creamy foam resulted and was flowed smoothly onto a film backing and passed through a dryer which warmed the foam to about 140–160° F. The foam expanded uniformly as it passed through the dryer to form a flexible blanket of insulation.

EXAMPLE VI 200 grams of animal glue having a Bloom jelly strength of 200 grams, a viscosity of 80 millipoises, and a grease content of less than 1% was dissolved in 800 grams of water. 10 grams of a 15% aqueous solution of sodium dodecyl benzene sulfonate was added along with 20 grams of a 50% solution of hydrogen cyanamide and the mixture heated to about 140° F. Foaming of the hot solution was carried out continuously by means of a gas lift-baffle type apparatus. The apparatus was operated at about 100 p.s.i. of helium pressure. The resulting foam was channeled onto a continuous belt lined with kraft paper. The foam, of 1–2 inch thickness, was dryed at 150° F. to yield a strong, rigid insulation board. Other foams were prepared from blood albumen, casein, soya and zein proteins, using the method set forth above.

While the proportions may vary, it is important, however, that the protein be used in proper ratio to the water present at the time of foaming so as to give a solution containing a rather high concentration of the protein. Accordingly, there can be used preferably about 15 to 50 grams of protein for every 100 grams of water although, for some purposes, the range may be made somewhat greater, i.e. about 8 to 100 grams per 100 grams of water.

While the instant invention has been described in reference to certain preferred embodiments, obviously many modifications and variations of the invention as hereinbefore set forth may be made without departing from the spirit and scope thereof, and therefore only such limitations should be imposed as are indicated in the appended claims.

I claim:

1. As a novel composition of matter, a self-supporting foamed product having a closed cellular structure comprising a substantially degreased and defatted proteinaceous foam, the cells of which are filled with helium and whose cell walls are substantially impermeable to the said helium.

2. The composition of claim 1 wherein the proteinaceous foam is prepared from a proteinaceous material selected from the group consisting of collagen and albumen.

3. An article of manufacture comprising a plurality of sheet elements bonded together by means of a cryogenic thermal insulating material, said material comprising a self-supporting foamed product having a closed cellular structure comprising a proteinaceous foam, the cells of which are filled with helium.

4. The article of claim 3 wherein the proteinaceous foam is prepared from a proteinaceous material selected from the group consisting of collagen and albumen.

5. A multi-layer article capable of being used as insulating material at cryogenic temperatures, said article comprising at least one metallic foil sheet and at least one foam layer sheet comprising a self-supporting foamed product having a closed cellular structure, said self-supporting foamed product comprising a proteinaceous foam, the cells of which are filled with helium.

References Cited

UNITED STATES PATENTS

| | | | |
|---|---|---|---|
| 1,925,142 | 9/1933 | Hallett | 106—18 |
| 2,140,327 | 12/1938 | Mould | 106—122 |
| 2,216,830 | 10/1940 | Roberts | 106—122 |
| 2,324,605 | 7/1943 | Urquhart | 106—122 |
| 2,323,831 | 7/1943 | Menger et al. | 144—309 |

EARL M. BERGERT, *Primary Examiner.*

D. J. FRITSCH, *Assistant Examiner.*

U.S. Cl. X.R.

106—122, 136, 147, 149, 154; 161—160; 264—50